UNITED STATES PATENT OFFICE.

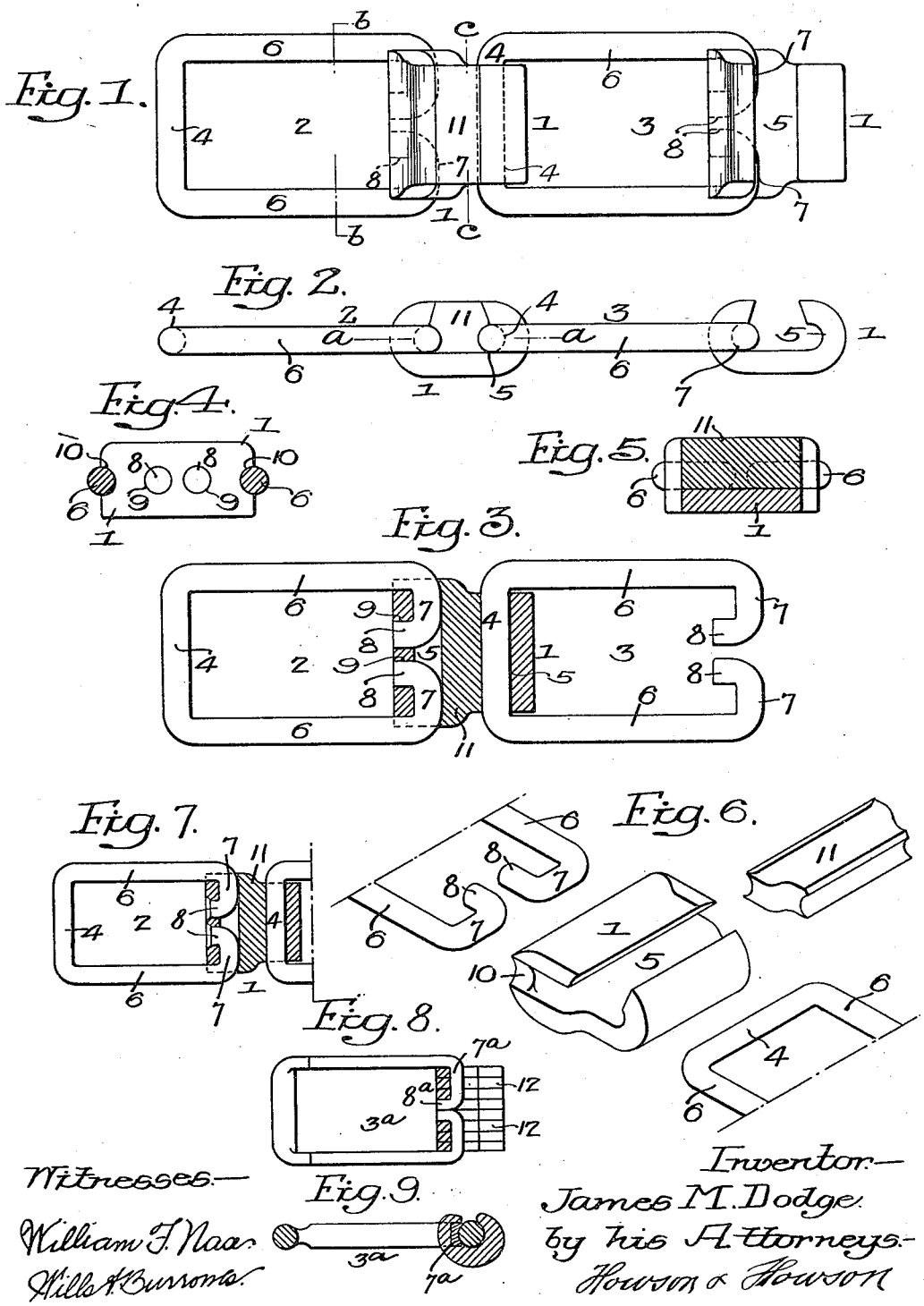

JAMES M. DODGE, OF PHILADELPHIA, PENNSYLVANIA.

CHAIN.

1,130,581. Specification of Letters Patent. Patented Mar. 2, 1915.

Application filed May 24, 1913. Serial No. 769,590.

*To all whom it may concern:*

Be it known that I, JAMES M. DODGE, a citizen of the United States, residing in Philadelphia, Pennsylvania, have invented certain Improvements in Chains, of which the following is a specification.

One object of this invention is to construct a chain, especially a drive chain, in which the hook member is rigidly attached to one link and is provided with a socket in which the end bar of an adjoining link can freely turn.

A further object of the invention is to provide a wedge for retaining both link elements in position in the hook member.

In the accompanying drawings: Figure 1, is a plan view of two links coupled together illustrating my invention; Fig. 2, is a side view; Fig. 3, is a sectional plan view on the line $a$—$a$, Fig. 2; Fig. 4, is a transverse sectional view on the line $b$—$b$, Fig. 1; Fig. 5, is a transverse sectional view on the line $c$—$c$, Fig. 1; Fig. 6, is a perspective view showing the parts detached; and Figs. 7, 8, and 9, are views illustrating modifications of the invention.

Referring to the drawings, 1 is the hook member and 2 is the link element to which the hook member is rigidly attached.

3 is the link member, in the present instance, which has a cross bar 4 adapted to a socket 5 of the hook member and is free to turn in this socket, as it will be understood that in chains of this type, where two link elements such as illustrated in Fig. 1 are connected by a member, one of these link elements must be rigidly attached to said member and prevented from turning therein, while the other must be free to turn therein. In all chains in which two link elements are free to turn in a short connecting member the result has been unsatisfactory and they have been found impracticable as drive chains.

The link element 2 consists of an end bar 4, side bars 6 and end members 7, which are formed by bending the ends of the bar from which the link element is made. The ends are also bent to form short longitudinal projections 8, which enter holes 9 in the hook member 1. The socket 5 of the hook member 1 is elongated and the end members 7 of the link element 2 fit in the rear end of the socket, the projections 8 extending into the holes, as mentioned above, while the bars 6 rest in grooves 10 in each side of the hook member. Thus, when the link element 2 is in position in the hook member it is prevented from turning independently of the hook member. I preferably so form the holes 9 in the hook member that the projections 8 will have a driving fit therein and, in some instances, I rivet these projecting members, as illustrated in Fig. 7.

By the above construction, it will be seen that, by making the link element with the inturned projections 8, the link element can be readily connected to its hook member by driving the projections into the openings in said hook member. The side bars of the link are prevented from spreading, due to this construction.

In order to hold the end bar of the link element 3 in position in the forward portion of the socket 5, I provide a block 11, which fills the opening in the socket member between the end members 6 of one element and the end bar 4 of the adjoining element and the block is shaped to fit these members so as to allow the end bar 4 to freely turn in the socket.

I preferably make the block 11 in the form of a wedge and beveled. The socket is tapered and undercut to conform to this wedge so that the wedge can be driven in position. The taper is so slight that there is no liability of the wedge being accidently displaced although, in some instances, it may be fastened, if desired.

The hook member is preferably of such a length that the driving face of a sprocket tooth, which enters the opening in the link elements, will seat itself against the hook member as in ordinary links of this type.

In Fig. 8, I have shown my invention as applied to a hook member made of a series of punched elements 12, the two central elements being cut away to allow for the introduction of the longitudinal projection $8^a$ of the link element $3^a$. This entire link, in this instance, may be welded, if desired. The end member $7^a$ is quadrangular instead of round. Furthermore, the end bar of an adjoining link is held against longitudinal movement by the wedge block, yet is free to turn in the hook member.

I claim:

1. The combination of a link member made of a blank bent to form an end bar, two side and two end members, said end members being bent at the ends to form two longitudinal projections; and a socket member recessed to receive the end members and perforated to receive the projections of said end members and having a socket for the reception of the end bar of an adjoining link.

2. The combination in a chain having detachable link elements, of two links each having an open center; a double hook member for the reception of the two adjoining bars of the said link elements, one of said link elements being secured to the hook member so as to prevent it from turning therein, the other link element being arranged to turn freely in the hook member; and a block arranged to close the hook member so as to confine both link elements against longitudinal movement in the hook member, but allowing for the free turning of the other hook member, both hook members being capable of being detached on the removal of the block.

In testimony whereof, I have signed my name to this specification, in the presence of two subscribing witnesses.

JAMES M. DODGE.

Witnesses:
WM. E. SHUPE,
WM. A. BARR.

Copies of this patent may be obtained for five cents each, by addressing the "Commissioner of Patents, Washington, D. C."